(12) United States Patent
Dobler et al.

(10) Patent No.: US 8,485,322 B2
(45) Date of Patent: Jul. 16, 2013

(54) BRAKE ASSEMBLY OR CLUTCH UNIT FOR A MOTOR VEHICLE

(75) Inventors: Johann Dobler, Legau (DE); Sven Kreiger, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 196 days.

(21) Appl. No.: 13/000,024

(22) PCT Filed: Jun. 23, 2009

(86) PCT No.: PCT/EP2009/057784
§ 371 (c)(1),
(2), (4) Date: Feb. 9, 2011

(87) PCT Pub. No.: WO2009/156383
PCT Pub. Date: Dec. 30, 2009

(65) Prior Publication Data
US 2011/0139553 A1 Jun. 16, 2011

(30) Foreign Application Priority Data
Jun. 23, 2008 (DE) .......................... 10 2008 029 583

(51) Int. Cl.
*F16D 65/853* (2006.01)
(52) U.S. Cl.
USPC ............... 188/71.6; 188/264 D; 188/264 CC; 192/113.3
(58) Field of Classification Search
USPC ..................... 188/71.6, 264 R, 264 B, 264 D, 188/264 CC, 264 E; 192/113.3, 113.34, 113.35, 192/113.36
See application file for complete search history.

(56) References Cited

U.S. PATENT DOCUMENTS

| | | | | |
|---|---|---|---|---|
| 2,518,016 A | * | 8/1950 | Johnson et al. | 188/264 E |
| 3,237,737 A | * | 3/1966 | Mamo | 192/113.34 |
| 4,113,067 A | | 9/1978 | Coons | |
| 4,269,289 A | * | 5/1981 | Winkler | 188/264 E |
| 4,483,422 A | | 11/1984 | Cory | |
| 4,815,573 A | | 3/1989 | Miyata | |
| 5,094,328 A | * | 3/1992 | Palmer | 192/113.34 |
| 5,495,927 A | * | 3/1996 | Samie et al. | 188/264 E |
| 5,911,292 A | * | 6/1999 | Schade et al. | 192/113.34 |
| 2007/0095622 A1 | * | 5/2007 | Mayberry et al. | 188/264 D |

FOREIGN PATENT DOCUMENTS

EP 1533538 5/2005

OTHER PUBLICATIONS

International Search Report from Application No. PCT/EP2009/057784 Dated Sep. 14, 2009.

\* cited by examiner

*Primary Examiner* — Thomas J Williams

(57) ABSTRACT

A brake assembly comprises a brake ring piston (30) and at least one coupling (33', 33). The brake ring piston (30) is provided with at least one channel (40, 43) through which a cooling agent can be supplied. The at least one channel leads to a surface of the brake piston which faces the at least one coupling.

18 Claims, 6 Drawing Sheets

Fig. 6

BRAKE ASSEMBLY OR CLUTCH UNIT FOR A MOTOR VEHICLE

The invention relates to a brake assembly or a clutch unit for a motor vehicle, in particular a utility vehicle.

The brake assemblies in the case of utility vehicles, such as, for example, agricultural machines, are preferably designed as ring piston brakes. In the case of ring piston brakes a fluid contained in a chamber is pressurized by a piston for example when a brake pedal is operated. Due to the negative pressurization and the associated pressure increase of the fluid in the chamber, a force is exerted on a brake piston, which is designed as a ring piston for example. Due to the application of force on the brake piston, this experiences an axial movement towards the brake element and, in the braked condition with maximum braking action, is coupled with this via an axially displaceable first coupling which is arranged between them.

The coupling of the brake piston with the brake element in the brake condition with maximum braking action alternatively can be implemented by an axially displaceable intermediate part which is arranged between the brake piston and the brake element. In this case, an axially displaceable first coupling is arranged between the brake piston and the intermediate part and an axially displaceable second coupling is arranged between the intermediate part and the brake element. A braking action on a rear wheel connected to an axle takes place in this case due to the fact that a rotation of the first and/or second coupling arranged on the axle is braked by friction between the brake components, such as for example the brake piston and/or the intermediate part with the first coupling and/or the intermediate part and/or the brake element with the second coupling, and thus the rotation of the axle with the rear wheel is braked. The first and second coupling can each therefore be designed as a brake disc.

So that as long a life as possible of the ring piston brake is guaranteed, sufficient cooling of the individual brake components must be ensured when the ring piston brake is operated. During braking operation the heat generated by friction on the brake components must be dissipated, in order to prevent overheating and damage of the brake components. In order to cool the brake components the brake components are partly arranged in a cooling agent bath located inside the ring piston brake.

Achieving sufficient cooling of the brake components becomes more difficult the slower the rotational speed of the axle, on which the first and second coupling are arranged. In the case of a slowly rotating axle only a small pumping effect is created by the first and second coupling, as a result of which an insufficient volume of cooling agent is transported from the cooling agent bath along the first and second coupling in a radial manner to the outside. Thus heat is insufficiently dissipated from the respective brake components, which leads to overheating of the brake components. For cooling the respective coupling, oil is preferably used as a cooling agent in this case.

Furthermore if the first and second coupling each have a large diameter, the cooling agent forms a film on an exterior surface of the respective coupling which shears off between emerging and being re-immersed in a cooling agent bath. Dry friction can occur between the respective coupling and the brake piston and/or the intermediate part and/or the brake element, as a result of which the wear inside the ring piston brake increases.

Since a clutch unit has a similar structure to the brake assembly, the same problems which are experienced in a brake assembly also arise in the clutch unit.

The object of the present invention is to provide a brake assembly or a clutch unit, in which the respective coupling is cooled sufficiently even at slow rotational speeds of the axle, and in which dry friction between the coupling and brake piston and/or the intermediate part and/or the brake element is reduced.

According to one aspect of the invention there is provided a brake assembly, comprising a brake piston and at least one coupling characterised in that the brake piston is provided with at least one channel through which a cooling agent can be supplied, and wherein said at least one channel leads to a surface of the brake piston which faces the at least one coupling.

According to a further aspect of the invention there is provided a clutch unit, comprising an actuating piston and a coupling, wherein the actuating piston has at least one channel, to which a cooling agent can be supplied, wherein the channel in each case leads to a surface lying opposite the coupling of the actuating piston.

The advantages of the invention in particular lie in the fact that a channel is provided for admitting cooling agent into the brake piston, wherein the channel is designed in such a manner that it leads to a surface of the brake piston facing the coupling. Thus, it is guaranteed that the surface of the brake piston which comes into functional contact with the surface, or face of the corresponding opposite coupling is sufficiently cooled. The channel ensures irrespective of the rotational speed of the axle, that a sufficient volume of cooling agent is always available to the brake components for cooling.

Another advantage of the invention is that cooling agent located outside of the brake assembly is fed to the brake piston by means of a cooling agent line. Thus irrespective of the rotational speed of the axle, a sufficient volume of cooling agent is always available to cool the coupling. As a result, in the case of a coupling with a large diameter dry friction between the coupling and the brake piston can be prevented since it is guaranteed that after the coupling has emerged from the cooling agent bath, it is supplied with sufficient cooling agent preventing the cooling agent film from shearing off.

A further advantageous embodiment of the invention is that the cooling agent is supplied to the respective coupling through a channel arranged inside the brake piston and/or intermediate part and/or brake element, which is diagonal to a surface, lying opposite the first and/or second coupling, of the brake piston and/or intermediate part and/or brake element. This channel here is designed as a nozzle, in order to equalize a low supply pressure in the cooling agent line. In the event that the supply pressure is too low in the cooling agent line, the supply of cooling agent to the respective coupling is no longer guaranteed. The outlet speed of the cooling agent leaving the channel in this case is too low, in order to guarantee wetting of the coupling. This cooling agent will, therefore, only flow out towards the cooling agent bath without wetting the coupling. By designing the channel as a nozzle a sufficiently high outlet speed is guaranteed, which ensures that a cooling agent is supplied to the respective coupling.

An advantageous embodiment of the invention also comprises a plurality of channels distributed around the inner periphery of the brake piston and/or intermediate part and/or brake element. As a result of these channels, cooling of the respective coupling can be improved due to the fact that a greater volume of cooling agent is supplied to the respective coupling. The danger of a dry film forming is also reduced at the same time, since cooling agent is supplied at several places to the respective coupling after it has emerged from the cooling agent bath.

The same advantages are also applicable to a clutch unit for a brake assembly.

The invention will now be described by example only with reference to the following figures in which:—

Figure 1:
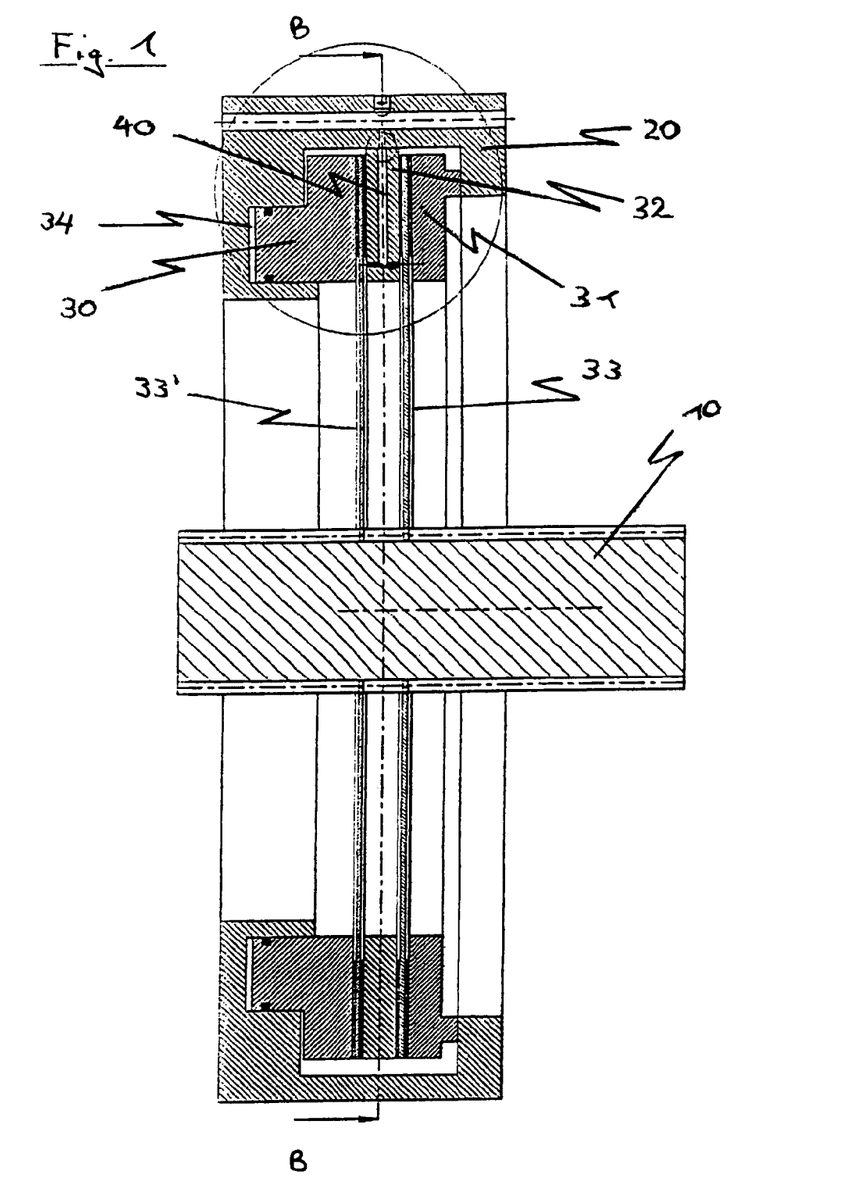
FIG. 1 a cutaway view of a ring piston brake.

FIG. 1 shows a cutaway view of a ring piston brake. The ring piston brake has a brake piston 30, an intermediate part 32 and a brake element 31. In this case a first axially displaceable coupling 33' is arranged between the brake piston 30 and the intermediate part 32 and a second axially displaceable coupling 33 is arranged between the intermediate part 32 and the brake element 33. The first and second coupling 33, 33' are coupled with a rotatable axle 10. The couplings 33, 33' are brake discs. The brake piston 30, the intermediate part 32 and the brake element 31 in each case are arranged non-rotatably on an anti-rotating housing 20, wherein the brake piston 30 and the intermediate part 32 are axially displaceable. Alternatively the brake element 31 need not be designed as a separate component but the braking action can take place through the housing 20.

During a brake operation a pressure in a chamber 34 arranged between the brake piston 30 and the anti-rotating housing 20 increases. Due to the pressure increase in the chamber 34 a force is exerted on the brake piston 30 in an axial direction towards the intermediate part 32, as a result of which the brake piston 30 moves in this direction. Due to the axial movement of the brake piston 30 the first coupling 33' is also displaced towards the intermediate part 32. A braking action on the axle 10 thereby takes place if the brake piston 30 is in contact with the first coupling 33'. This braking action is amplified as soon as the first coupling 33' is also additionally in contact with the intermediate part 32.

Dependent on the pressure increase in the chamber 34, the brake piston 30 with the first coupling 33' and the intermediate part 32 can be displaced further towards the brake element 31. In this case the maximum braking action on the axle 10 is only obtained if the brake piston 30, the first coupling 33' and the intermediate part 32 are axially displaced so that the intermediate part 32 is in contact with the second coupling 33 and this with the brake back plate 31.

Alternatively, a brake assembly, in which the braking action takes place through only a brake piston and a coupling (not shown), is also conceivable. The coupling is non-displaceably arranged on the axle. Furthermore the coupling and/or the brake piston is dimensioned in such a manner that the torque created by the brake piston does not lead to damage of the coupling. A braking action takes place in this case corresponding to the brake assembly specified above, since the brake piston is displaced in such a manner that it is in contact with the coupling. Moreover it is possible that the coupling is designed to be displaceable. In this case this is pushed by the brake piston against the brake element or housing. Thus a braking action takes place on the axle from both sides of the coupling.

Figure 2:
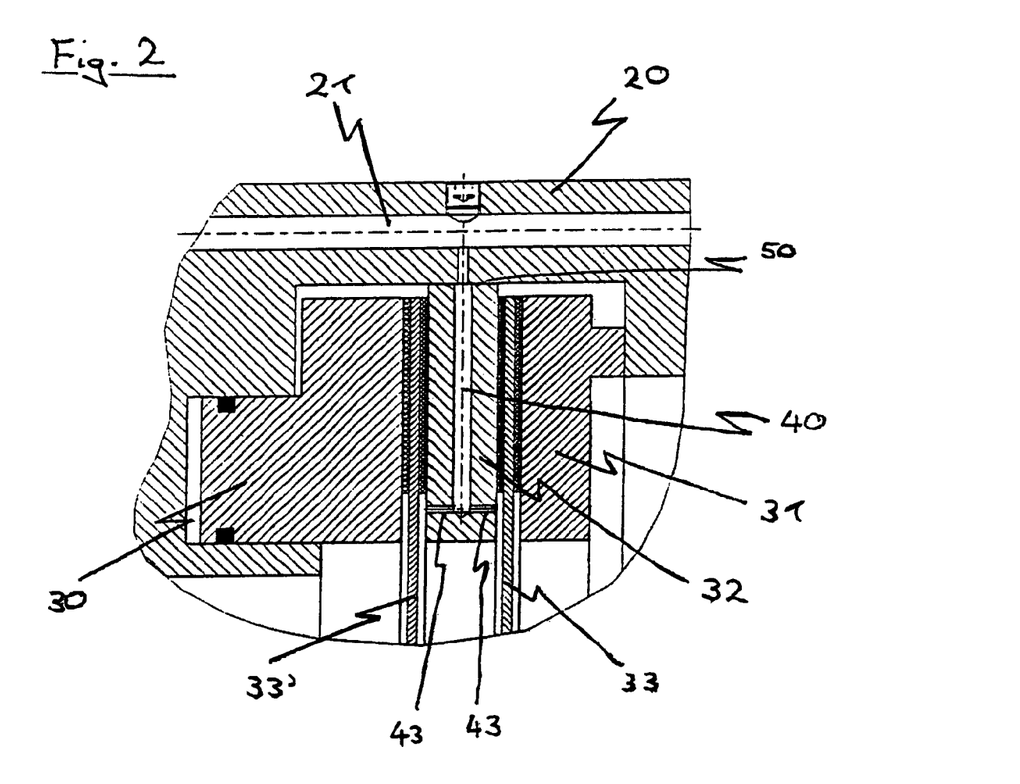
FIG. 2 an enlarged cutout of the transitional region of the cooling agent line and of the channels arranged in the intermediate part, and FIG. 3 an enlarged cutout of the transitional region of the cooling agent line and the channels arranged in the brake piston, and FIG. 4 an enlarged cutout of the transitional region of the cooling agent line and the channels arranged in the brake element, and FIG. 5 a cutaway view of an intermediate part with a plurality of channels distributed around the periphery of the intermediate part, FIG. 6 a cutaway view of a clutch unit.

FIG. 2 shows an enlarged cutout of the transitional region of a cooling agent line 21 and a channel 40, 43 arranged in the intermediate part 32. The channel in this case is composed of a first channel 40, the axial direction of which is parallel to the first or second coupling 33', 33, and two second channels 43, which each run diagonally to a surface, lying opposite the first or second coupling 33', 33, of the intermediate part 32. The second channels 43 are designed in such a manner that emanating from the first channel 40 they lead to the respective surface, lying opposite the first or second coupling 33', 33, of the intermediate part 32 and thus guarantee that the cooling agent wets the respective surface of the intermediate part 32. The second channels 43 in this case are preferably arranged at one end of the first channel 40. In addition however embodiments are conceivable, in which the second channels 43 are arranged between the two ends of the first channel 40. Moreover a plurality of second channels 43 can be arranged between both ends of the first channel 40.

Furthermore these second channels 43 in each case can be designed as nozzles, which have a smaller diameter than the first channel 40. By the nozzles it is guaranteed that with a low supply pressure in the cooling agent line 21 a defined cooling agent flow to the surfaces lying opposite the intermediate part 32, of the first and second coupling 33', 33 is ensured. Thus friction between the intermediate part 32 with the first and/or the second coupling 33', 33 can be prevented. It is not necessary to design the second channels as nozzles if the supply pressure in the cooling agent line 21 is so high that a supply of cooling agent to the respective coupling 33', 33 is guaranteed.

Furthermore one end of channel 40 at a distance from the second channels 43, is fluidically connected to the cooling agent line 21 arranged inside the anti-rotating housing 20. This cooling agent line 21 for example may be a branch of a cooling agent circuit of an axle transmission (not shown). Moreover the volume of oil needed for cooling can also be taken from the cooling agent bath inside the housing 20. Here a combination of the usual immersion lubrication and the described lubrication with oil supplied via channels would be the case. Since in the present invention the oil is fed via a lubricating oil pump to the lubrication points, this is also known as force-feed lubrication. The diameter of the first channel 40 is selected in such a manner that the first channel 40, irrespective of the axial movement of the intermediate part 32, is always fluidically connected to the cooling agent line 21. In this case a gasket 50 can be arranged between the anti-rotating housing 20 and the intermediate part 32.

Figure 3:
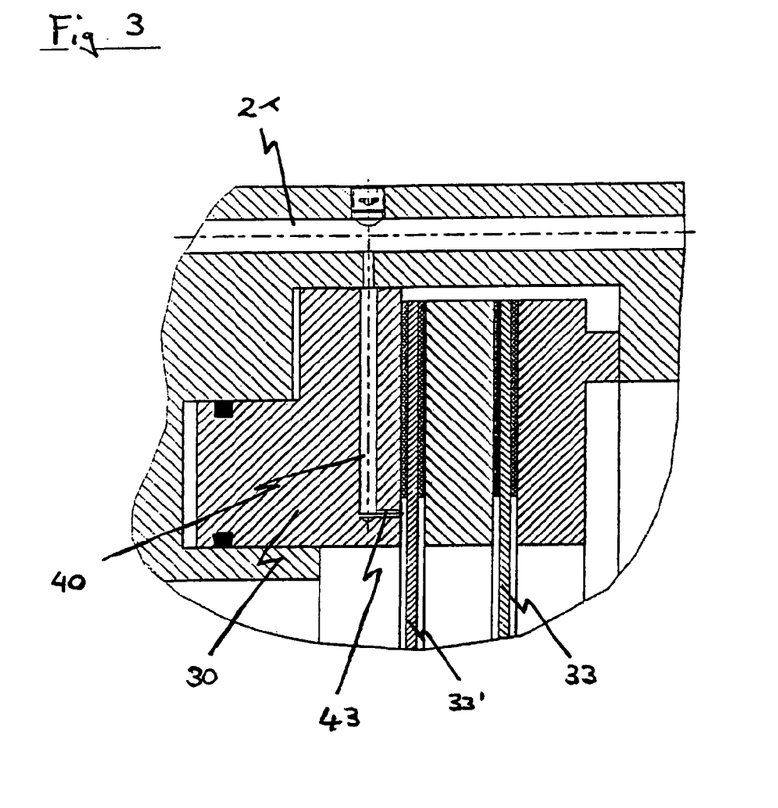
Figure 4:
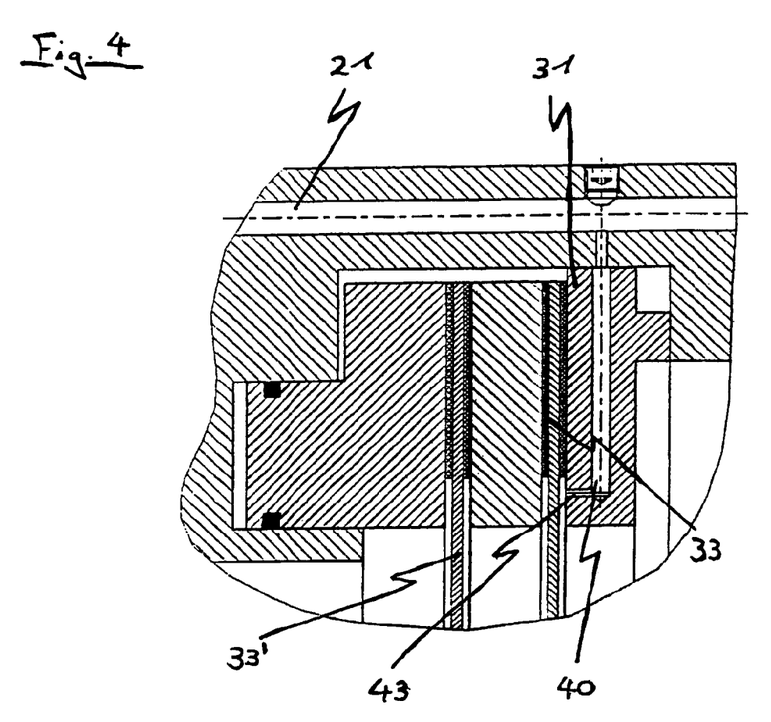

FIGS. 3 and 4 show further embodiments of the transitional area, in which the channel 40, 43 in each case is arranged only in the brake piston 30 or in the brake element 31. In addition, further embodiments are conceivable, in which the channel 40, 43 is arranged in the brake piston 30 and/or in the brake element 31 and/or in the intermediate part 32.

This channel illustrated in FIGS. 3 and 4 is composed of a first channel 40 and a second channel 43, wherein the first channel 40 is connected at one end to the cooling agent line 21. At the other end, the first channel 40 is connected to a second channel 43 which leads to a respective surface of the piston 30 facing the first or second coupling 30', 33 or the brake element 31. Through this second channel 43 the cooling agent flows out of the brake piston 30 and/or the brake element 31 and wets the respective surface, preventing dry friction between the first or second coupling 33', 33 and the respective surface. Also the diameter of the first channel 40 is selected in such a manner that the first channel 40 remains fluidically connected to the cooling agent line 21 whenever the brake piston 30 moves axially.

Figure 5:
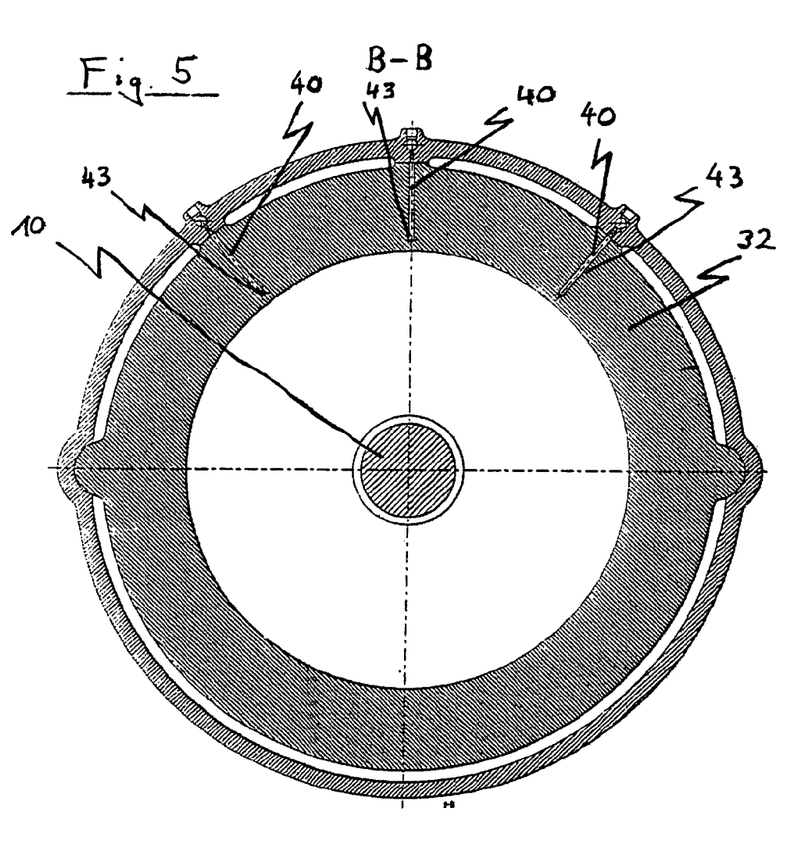

FIG. 5 shows a cutaway view, in which a plurality of channels distributed around the periphery of the intermediate part 32 are arranged. These channels are composed of the first channels 40 and the second channels 43 and are arranged on the intermediate part 32 in such a manner that they are located above a cooling agent bath not illustrated in FIG. 5.

Furthermore an arrangement of a plurality of channels, not illustrated in FIG. 5, distributed around the periphery, in the brake piston 30 and in the brake element 31 are conceivable. Thus cooling agent can be supplied via the channels of the first and/or second coupling 33', 33 after emerging from the cooling agent bath at different places distributed around the periphery.

Furthermore embodiments are also conceivable, in which the channels are successively arranged in the brake piston 30 and/or intermediate part 32 and/or brake element 31 not only distributed around the periphery, but also towards the axle 10.

Figure 6:
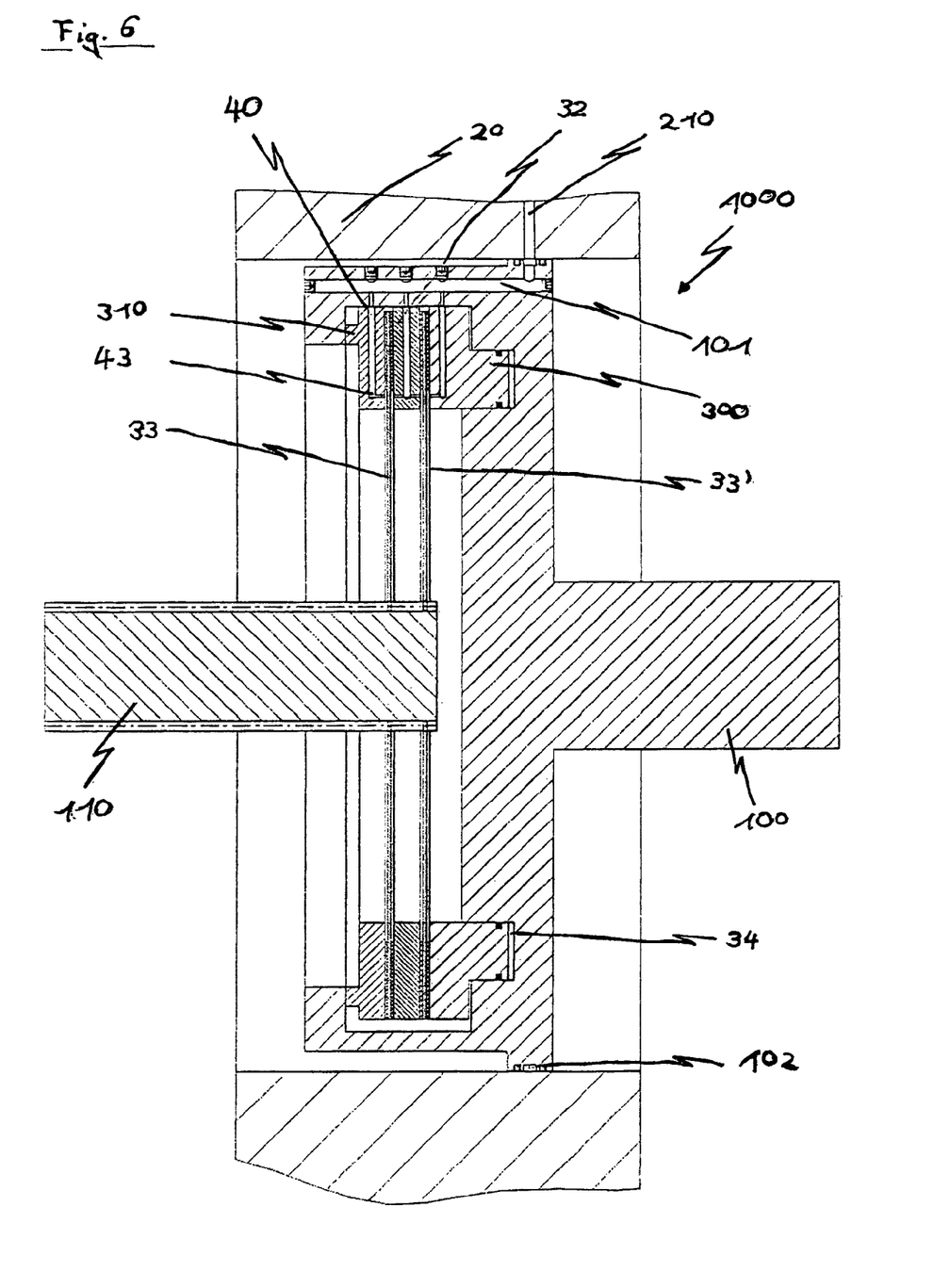

FIG. 6 shows a cross sectional view of a clutch unit 1000. In this case similar components of the brake assembly and the clutch unit have the same reference symbols.

The clutch unit 1000 is illustrated in a state, where the torque of a drive shaft 100 is totally transmitted to an output shaft 110. In this case the drive shaft 100 and the output shaft 110 are accommodated in an anti-rotating housing 20. An actuating piston 300, an intermediate part 32 and a clutch element 310 are arranged on the drive shaft 100, wherein the actuating piston 300 and the intermediate part 32 are axially displaceable. Additionally the actuating piston 300 is arranged on the drive shaft 100 in such a manner that a control space 34 is formed between them.

The actuating piston 300 and/or the intermediate part 32 and/or the clutch element 310 have a channel 40, 43. The channel 40, 43 in this case is formed corresponding to the channel of the brake assembly. A coupling 33, 33' is arranged in each case between the actuating piston 300 and the intermediate part 32 and between the intermediate part 320 and the clutch element 310. The coupling 33, 33' is located on the output shaft 110.

Moreover the drive shaft 100 has at least one first cooling agent line 101. In addition however embodiments are conceivable, in which a plurality of first cooling agent lines 101 distributed around the periphery are arranged in the drive shaft 100. These are fluidically connected in each case to a first channel 40 of the actuating piston 300 and/or intermediate part 32 and/or the clutch element 310. Additionally these first cooling agent lines 101 are fluidically connected via an annular groove 102 arranged in the drive shaft 100 to a second cooling agent line 210 arranged in the housing 20.

The clutch operation essentially takes place corresponding to the brake operation of the brake assembly. The only difference to the brake operation consists in that inside the clutch unit 1000 the actuating piston 300, the intermediate part 32 and the clutch element 310 rotate together with the drive shaft 100. Therefore no braking action but only torque transmission between the drive shaft and the output shaft can be guaranteed by the couplings 33', 33 contacting the intermediate part and/or the clutch element 310.

A clutch operation can also take place via a not illustrated clutch unit, which has only one actuating piston and one coupling. The coupling in this case is non-displaceably arranged on the output shaft. A torque transmission takes place due to the fact that the actuating piston is displaced so far until it is in contact with the coupling.

Also an embodiment is conceivable, in which the above drive shaft 100 is designed as an output shaft and the output shaft 110 as drive shaft.

All further embodiments of the brake assembly are also valid for the respective clutch unit accordingly.

The invention claimed is:

1. A brake or clutch assembly comprising a housing surrounding and supporting an actuating piston which is non-rotatable relative to the housing, a pair of coupling members which are rotatable relative to the housing and coupling members which are non-rotatable relative to the housing, the rotatable and non-rotatable coupling members being brought into engagement on actuation of the piston to engage the brake or clutch assembly, the piston being provided with fully enclosed internal radially inwardly extending cooling oil passages which receive cooling oil from passages in the surrounding housing to direct cooling oil radially inwardly within the piston, the oil exiting from the radial passages in the piston via axially orientated openings facing the rotatable coupling members to provide cooling oil to the rotatable coupling members, wherein said pair of rotatable coupling members are provided with an intermediate non-rotatable member therebetween, one rotatable coupling member being pressed by the piston against the intermediate member and the other rotatable coupling member being pressed against a non-rotatable member when the piston is actuated.

2. An assembly according to claim 1 in which the intermediate member includes radially extending cooling oil passages therein to provide cooling oil to the rotatable members.

3. An assembly according to claim 1 in which the non-rotatable component includes radially extending cooling passages therein to provide cooling oil to the rotatable members.

4. An assembly according to claim 1 in which the radially inwardly extending cooling oil passages are distributed around the periphery of the component containing the passages.

5. An assembly according to claim 1 in which the openings of the radially inwardly extending passages are designed as nozzles.

6. An assembly according to claim 1 in which the cooling oil is connected with a cooling oil supply of an associated vehicle axle.

7. An assembly according to claim 6 in which the cooling oil is received from an oil bath within the housing.

8. An assembly according to claim 1 in which the housing is non-rotatable so that the assembly functions as a disc brake.

9. An assembly according to claim 1 in which the housing is rotatable with either and input shaft or an output shaft so that the assembly functions as a clutch with the supply of cooling oil coming from a further housing which surrounds the rotatable housing.

10. A brake or clutch assembly comprising a housing surrounding and supporting an actuating piston which is non-rotatable relative to the housing, a pair of coupling members which are rotatable relative to the housing and coupling members which are non-rotatable relative to the housing, the rotatable and non-rotatable coupling members being brought into engagement on actuation of the piston to engage the brake or clutch assembly, the non-rotatable members of the assembly being provided with fully enclosed internal radially inwardly extending cooling oil passages which receive cooling oil from passages in the surrounding housing to direct cooling oil radially inwardly within the non-rotatable members, the oil exiting from the radial passages in the non-rotatable members via axially orientated openings facing the rotatable coupling members to provide cooling oil to the rotatable members, wherein said rotatable coupling members are provided with an intermediate non-rotatable member therebetween, one rotatable coupling member being pressed by the piston against the intermediate member and the other rotatable coupling member being pressed against a non-rotatable member when the piston is actuated.

11. An assembly according to claim 10 in which the intermediate member includes radially extending cooling oil passages therein to provide cooling oil to the rotatable members.

12. An assembly according to claim 10 in which the piston includes radially extending cooling oil passages therein to provide cooling oil to the rotatable member.

13. An assembly according to claim 10 in which the radially inwardly extending cooling oil passages are distributed around the periphery of the component containing the passages.

14. An assembly according to claim 10 in which the openings of the radially inwardly extending passages are designed as nozzles.

15. An assembly according to claim 10 in which the cooling oil is connected with a cooling oil supply of an associated vehicle axle.

16. An assembly according to claim 15 in which the cooling oil is received from an oil bath within the housing.

17. An assembly according to claim 10 in which the housing is non-rotatable so that the assembly functions as a disc brake.

18. An assembly according to claim 10 in which the housing is rotatable with either and input shaft or an output shaft so that the assembly functions as a clutch with the supply of cooling oil coming from a further housing which surrounds the rotatable housing.

\* \* \* \* \*